Patented Feb. 7, 1950

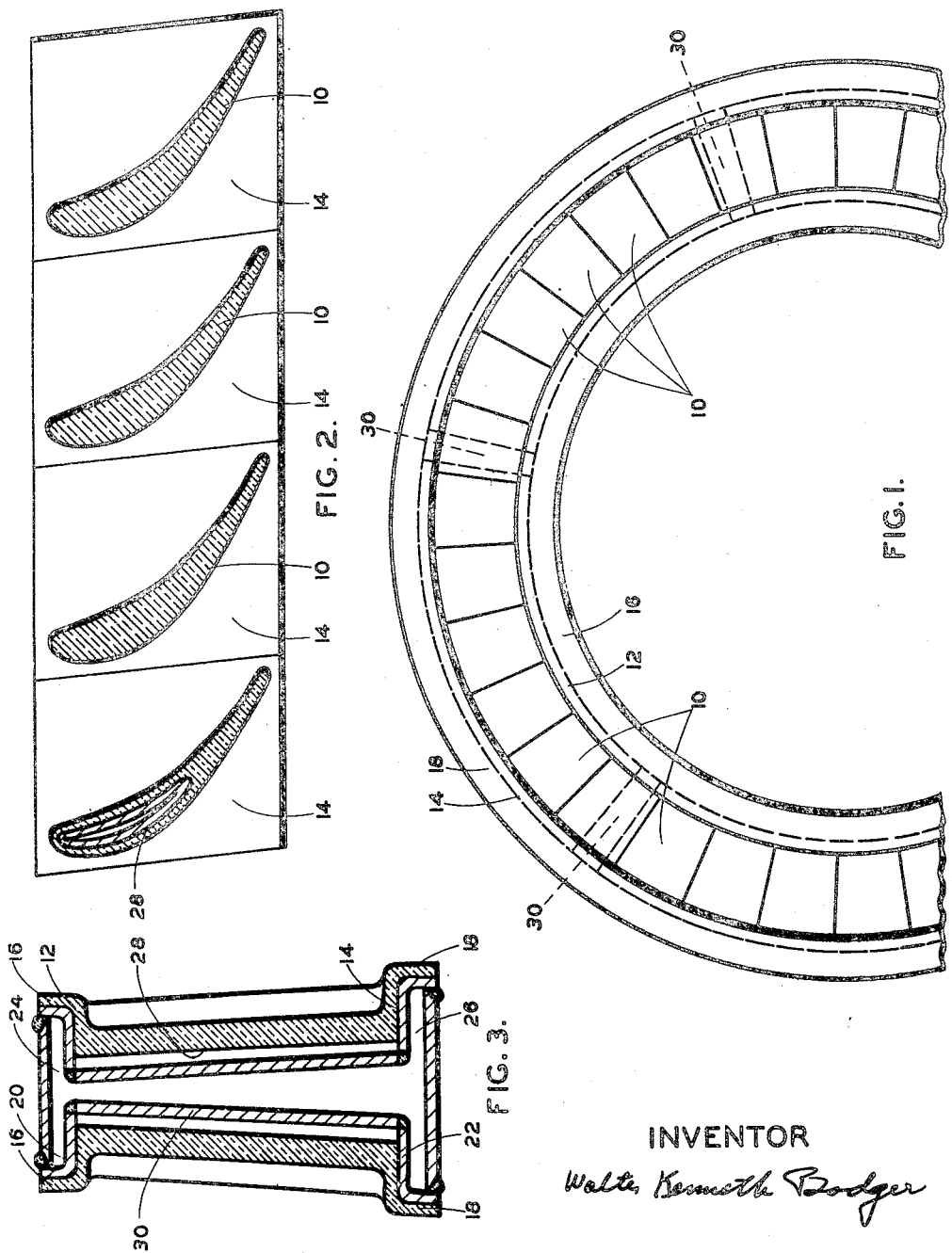

2,497,041

UNITED STATES PATENT OFFICE 2,497,041

NOZZLE RING FOR GAS TURBINES

Walter Kenneth Bodger, South Glastonbury, Conn., assignor to United Aircraft Corporation, East Hartford, Conn., a corporation of Delaware Application March 27, 1945, Serial No. 585,161

1 Claim. (Cl. 253—78)

This invention relates to a nozzle ring for a gas turbine.

The operating temperatures of turbines are limited by the materials available which rapidly lose strength at the high temperatures desirable for efficient operation. The metals used are also subject to creep at high temperatures and may during operation at elevated temperatures increase in dimension to such an extent that further efficient operation is impossible. A feature of this invention is a nozzle ring having exposed parts made of a heat resistant ceramic material.

Certain ceramics that have the desirable heat resistant characteristics do not have the strength necessary to withstand the stresses applied during turbine operation. A feature of the invention is a nozzle ring in which the ceramic vane elements are reinforced by metallic rings. Another feature is an arrangement for cooling the metallic reinforcing rings. A feature of the invention is the assembly of the nozzle ring from individually formed ceramic vanes. Another feature is the arrangement of each vane with integral inner and outer ring segments so that the vanes are properly spaced when they are assembled on the supporting structure.

Other objects and advantages will be apparent from the specification and claim, and from the accompanying drawings which illustrate an embodiment of the invention.

Fig. 1 is a side elevation of a part of the nozzle ring.

Fig. 2 is a developed sectional view through several of the ceramic vanes.

Fig. 3 is a radial sectional view through the nozzle ring.

The nozzle ring is adapted for use either in a single stage turbine or as one of the nozzle rings in a multi-stage turbine of the type shown in the copending application of Bodger, Serial No. 550,872, filed August 23, 1944. The nozzle ring includes a number of ceramic vane elements 10, Fig. 2, having at opposite ends inner and outer ring segments 12 and 14 of the same material. These ring segments have radially extending flanges 16 and 18 which engage over inner and outer metallic supporting rings 20 and 22. As shown, the flanges 16 extend radially inward toward the center of the nozzle ring and the flanges 18 extend radially outward so that the inner and outer supporting rings fit between the flanges. As shown in Fig. 2, the ring segments 12 and 14 are made of such a width that when the adjoining vane elements are mounted on the supporting rings with the ring segments in contact, the blades will be properly spaced around the nozzle ring.

The supporting rings 20 and 22 may be built up from separate elements welded together, as shown in Fig. 3, to form hollow rings with openings 24 and 26 through which a coolant may be circulated in order to keep the rings at such a temperature that the permissible stress in the metal, which decreases as the temperature increases, will not be exceeded. Circulation of coolant between inner and outer rings may be provided, if desired, by making a number of the vanes 10 hollow, as indicated at 28, to receive metallic tubes 30 connecting at opposite ends with the inner and outer rings, as shown.

With the built-up construction described, the surfaces of the nozzle ring which are normally exposed to the hot gas in the turbine are ceramic material, and direct transfer of heat to the metal supporting structure is greatly reduced. The metallic supporting structure will carry the loads applied to the nozzle ring and the ceramic material itself will not be subjected to stresses above those which it is capable of withstanding. In the arrangement shown in the drawing, the tubes 30 are out of contact with the vane elements through which they extend to reduce the direct transfer of heat from the ceramic to the tube.

The ceramic used is preferably one which can withstand temperatures as high as or higher than 2000° F. in order to produce a turbine which can operate with gases at these high temperatures. The ceramic at these temperatures will retain a satisfactory compressive strength and will not be undesirably affected by the hot gases. The surface will be smooth so that it will not provide too much resistance to the flow of the gas.

It will be understood that the inner or outer supporting ring 20 or 22 may have mounted there-on suitable supporting means or flanges by which the nozzle ring may be mounted within the turbine structure.

It is to be understood that the invention is not limited to the specific embodiment herein illustrated and described, but may be used in other ways without departure from its spirit as defined by the following claim.

I claim:

A nozzle ring for turbines, including ceramic vanes at least some of which are hollow, inner and outer supporting rings between which the vanes extend, circumferentially spaced radially extending elements in said hollow vanes and fixed at their ends to the rings, ring segments on both ends of vanes adapted to extend over and cover the rings, said ring segments being wide enough circumferentially to correspond to the vane spacing, adjacent ring segments engaging one another edgewise to hold the vanes in predetermined circumferential spaced relation within the supporting rings, said ring segments, at least at one end of each vane, having radially extending flanges at opposite edges of the ring segments extending over and engaging with the side surfaces of the adjacent supporting ring for positioning the vanes axially with respect to the supporting rings.

WALTER KENNETH BODGER.

REFERENCES CITED

The following references are of record in the file of this patent:

UNITED STATES PATENTS

| Number | Name | Date |
|---|---|---|
| 1,928,504 | Schaper | Sept. 26, 1933 |
| 1,998,951 | Downer | Apr. 23, 1935 |
| 2,308,233 | Schutte | Jan. 12, 1943 |
| 2,341,664 | Schutte | Feb. 15, 1944 |
| 2,417,486 | Hagemann, et al. | Mar. 18, 1947 |

FOREIGN PATENTS

| Number | Country | Date |
|---|---|---|
| 24,657 | Great Britain | Oct. 28, 1912 |
| 217,457 | Great Britain | June 14, 1924 |
| 379,097 | Italy | Mar. 11, 1940 |
| 380,391 | Italy | May 11, 1940 |